US009884962B2

(12) United States Patent
Gössi et al.

(10) Patent No.: US 9,884,962 B2
(45) Date of Patent: Feb. 6, 2018

(54) SHAPE MEMORY MATERIAL BASED ON A STRUCTURAL ADHESIVE

(71) Applicant: SIKA TECHNOLOGY AG, Baar (CH)

(72) Inventors: Matthias Gössi, Uster (CH); Jürgen Finter, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/627,359

(22) Filed: Sep. 26, 2012

(65) Prior Publication Data
US 2013/0034736 A1 Feb. 7, 2013

Related U.S. Application Data

(63) Continuation of application No. PCT/EP2011/054642, filed on Mar. 25, 2011.

(30) Foreign Application Priority Data

Mar. 26, 2010 (EP) ..................................... 10158076

(51) Int. Cl.
C08L 75/04 (2006.01)
C09J 163/00 (2006.01)
C09J 175/04 (2006.01)
C08L 63/00 (2006.01)

(52) U.S. Cl.
CPC ............. *C08L 75/04* (2013.01); *C09J 163/00* (2013.01); *C09J 175/04* (2013.01); C08G 2280/00 (2013.01); C08L 63/00 (2013.01); Y10T 428/31511 (2015.04); Y10T 428/31529 (2015.04)

(58) Field of Classification Search
CPC .......... C08L 75/04; C08L 31/04; C08L 63/00; C09J 163/00; C09J 175/04; Y10T 428/31529; Y10T 428/31511; C08G 2280/00
USPC ........................................................ 523/400
See application file for complete search history.

(56) References Cited

U.S. PATENT DOCUMENTS

| 3,227,668 | A | * | 1/1966 | Ackermann ................... 523/465 |
| 3,649,714 | A | | 3/1972 | Wangsness et al. |
| 4,756,968 | A | | 7/1988 | Ebe et al. |
| 4,766,183 | A | | 8/1988 | Rizk et al. |
| 4,888,124 | A | | 12/1989 | Blum et al. |
| 4,923,934 | A | | 5/1990 | Werner |
| 5,001,194 | A | * | 3/1991 | Henton .......................... 525/197 |
| 5,086,088 | A | | 2/1992 | Kitano et al. |
| 5,145,935 | A | | 9/1992 | Hayashi |
| 5,322,724 | A | * | 6/1994 | Levens ............................ 428/57 |
| 5,331,062 | A | | 7/1994 | Sorathia et al. |
| 5,763,529 | A | | 6/1998 | Lucas |
| 5,895,718 | A | * | 4/1999 | Ishimura ............... C08L 101/00 525/418 |
| 5,965,256 | A | | 10/1999 | Barrera |
| 6,077,601 | A | * | 6/2000 | DeVoe et al. .................. 428/323 |
| 6,136,398 | A | | 10/2000 | Willett et al. |
| 6,258,138 | B1 | * | 7/2001 | DeVoe et al. .................... 51/298 |
| 6,322,890 | B1 | | 11/2001 | Barron et al. |
| 6,359,027 | B1 | * | 3/2002 | Dahlke et al. ................ 522/153 |
| 6,368,438 | B1 | | 4/2002 | Chang et al. |
| 6,372,336 | B1 | * | 4/2002 | Clausen et al. ............... 428/323 |
| 6,387,470 | B1 | | 5/2002 | Chang et al. |
| 6,388,043 | B1 | | 5/2002 | Langer et al. |
| 6,734,263 | B2 | | 5/2004 | Eadara et al. |
| 7,005,394 | B1 | | 2/2006 | Ylitalo et al. |
| 7,288,604 | B2 | | 10/2007 | Kuntimaddi et al. |
| 2003/0092777 | A1 | | 5/2003 | Leitner |
| 2003/0119987 | A1 | | 6/2003 | Eadara et al. |
| 2004/0033324 | A1 | | 2/2004 | Meyer |
| 2005/0198907 | A1 | | 9/2005 | McKnight et al. |
| 2006/0089428 | A1 | * | 4/2006 | Hakata ................ C08L 23/0853 524/59 |
| 2006/0270800 | A1 | | 11/2006 | Teyssie et al. |
| 2007/0191556 | A1 | | 8/2007 | Eger |
| 2008/0257094 | A1 | | 10/2008 | Xie et al. |
| 2008/0257485 | A1 | | 10/2008 | Xie et al. |
| 2008/0262188 | A1 | | 10/2008 | Xie et al. |
| 2008/0269420 | A1 | | 10/2008 | Tong et al. |
| 2009/0131557 | A1 | | 5/2009 | Uyama et al. |

(Continued)

FOREIGN PATENT DOCUMENTS

CN   1774220 A    5/2006
DE   36 39 266 A1  7/1987
(Continued)

OTHER PUBLICATIONS

EPON Resin Structural Reference Manual, EPON Resins-EPI-CURE Curing Agents-HELOXY Modifiers, Appendix 1, EPON Resin-Curing Agent Systems, Resolution Performance Products 2001.*
International Preliminary Report on Patentability dated Oct. 2, 2012 issued in PCT/EP2011/054647.
Written Opinion dated Oct. 2, 2012 issued in PCT/EP2011/054647.
International Search Report (PCT/ISA/210) dated May 30, 2011, by the European Patent Office as the International Searching Authority for International Application No. PCT/EP2011/054642.
International Search Report (PCT/ISA/210) dated May 30, 2011, by the European Patent Office as the International Searching Authority for International Application No. PCT/EP2011/054647.
Written Opinion (PCT/ISA/237) dated May 30, 2011, by the European Patent Office as the International Searching Authority for International Application No. PCT/EP2011/054642.

(Continued)

Primary Examiner — Alexander Kollias
(74) Attorney, Agent, or Firm — Buchanan Ingersoll & Rooney PC

(57) ABSTRACT

A composition, including at least one curable structural adhesive, and at least one thermoplastic elastomer, wherein the thermoplastic elastomer is present in the structural adhesive as penetrating polymer network. Such a composition constitutes a so-called shape memory material and is suitable for reinforcing cavities in structural components, such as, for example, in automobile bodies.

24 Claims, 3 Drawing Sheets

(56) References Cited

U.S. PATENT DOCUMENTS

| | | | |
|---|---|---|---|
| 2009/0280318 A1* | 11/2009 | Matsugi et al. | ............ 428/334 |
| 2009/0280330 A1 | 11/2009 | Xie et al. | |
| 2010/0021406 A1* | 1/2010 | Raineau et al. | ............ 424/70.7 |
| 2010/0108268 A1 | 5/2010 | Finter et al. | |
| 2010/0291368 A1* | 11/2010 | Burckhardt | ............ C08G 18/12 |
| | | | 428/221 |
| 2010/0307682 A1 | 12/2010 | Schumann et al. | |
| 2011/0120646 A1 | 5/2011 | Gorodisher et al. | |
| 2013/0020832 A1* | 1/2013 | Finter et al. | ............ 296/187.01 |
| 2013/0034736 A1 | 2/2013 | Gossi et al. | |
| 2013/0186562 A1 | 7/2013 | Finter et al. | |

FOREIGN PATENT DOCUMENTS

| | | |
|---|---|---|
| EP | 0 204 970 A2 | 12/1986 |
| EP | 0 230 666 A2 | 8/1987 |
| EP | 0 432 923 A1 | 6/1991 |
| EP | 0 622 833 A1 | 11/1994 |
| EP | 0 922 720 A1 | 6/1999 |
| EP | 1 155 084 A1 | 11/2001 |
| EP | 2 182 025 A1 | 5/2010 |
| EP | 2368955 A1 | 9/2011 |
| JP | 62-197413 A | 9/1987 |
| JP | 03-294329 A | 12/1991 |
| JP | 2002513836 A | 5/2002 |
| JP | 2002-520441 A | 7/2002 |
| JP | 2002-529566 A | 9/2002 |
| JP | 2003-201325 A | 7/2003 |
| JP | 5990159 B2 | 9/2016 |
| WO | 94/29358 A1 | 12/1994 |
| WO | 97/11122 A1 | 3/1997 |
| WO | 98/45382 A1 | 10/1998 |
| WO | 99/57197 A1 | 11/1999 |
| WO | WO 00/02968 A1 | 1/2000 |
| WO | WO 00/27920 A1 | 5/2000 |
| WO | 2005019285 A1 | 3/2005 |
| WO | 2007/129681 A1 | 11/2007 |
| WO | WO 2008/059056 A1 | 5/2008 |
| WO | 2009016106 A1 | 2/2009 |
| WO | WO 2009/016106 A1 | 2/2009 |
| WO | WO 2009/034023 * | 3/2009 ............ C08K 5/315 |
| WO | 2009098141 A1 | 8/2009 |
| WO | 2010011705 A1 | 1/2010 |

OTHER PUBLICATIONS

Written Opinion (PCT/ISA/237) dated May 30, 2011, by the European Patent Office as the International Searching Authority for International Application No. PCT/EP2011/054647.

R. E. Touhsaent et al., "Epoxy/Acrylic Simultaneous Interpenetrating Networks", J. Polymer Sci.: Symposium, 1974, No. 46, pp. 175-190, XP-002597611.

International Preliminary Report on Patentability for Application PCT/EP2011/054642 dated Oct. 2, 2012.

IUPAC Compendium of Chemical Terminology, 2$^{nd}$ Edition (1997), 1996, 68, 2305, 2 pages.

Office Action dated Jan. 8, 2014, in U.S. Appl. No. 13/627,502, U.S. Patent and Trademark Office, Alexandria, VA. (15 pages).

Derwent Accession No. 2011-M30444 for US 2013/0034736 and EP 2,368,955 A1, Finter et al., Sep. 28, 2011, one page.

"Momentive Technical Data Sheet, Re-issued Sep. 2005, EPON™ Resin 828," www.momentive.com, http://www.momentive.com/Products/TechnicalDataSheet.aspx?id=3942 (accessed Jun. 17, 2014).

"Momentive Technical Data Sheet, Re-issued Sep. 2007, HELOXY™ Modifier 71," www.momentive.com, http://www.momentive.com/Products/TechnicalDataSheet.aspx?id=2638 (accessed Jun. 17, 2014).

Jurgen Finter et al., U.S. Appl. No. 13/627,502, filed Sep. 26, 2012.

Office Action dated Aug. 26, 2014, by the Japanese Patent Office in Japanese Patent Application No. 2013-501772, and an English translation of the Office Action. (11 pages).

Notification of the Third Office Action dated Jun. 19, 2014, by the State Intellectual Property Office of the People's Republic of China in Chinese Patent Application No. 201180021943.7, and an English translation of the Office Action. (13 pages).

Rawi Kh. et al., "Mechanical properties of Epoxy—Polyurethane Polymer Blends", Um-Salama Science Journal, vol. 3(4), 2006, pp. 637-642.

Rousseau, I. et al., "Shape Memory Epoxy: a Systematic Study of their Performance", Behavioral and Mechanics of Multifunctional Materials and Composites, Proc. of SPIE, vol. 7289, 2009, pp. 72890X1-72890X12.

Sands, J. et al. "Interpenetrating polymer network (IPN) Adhesives for Electron Beam Cure", ARL-TR-2321, Army Research Laboratory, Aberdeen Proving Ground, MD 21005-5069, Sep. 2000, pp. i-x, 1-37.

Shi Youheng et al. "Synthesis and Properties of Polyurethane Acrylate/Epoxy Resin Interpenetrating Polymer Networks", Chinese Journal of Polymer Science, vol. 6, No. 3, 1988, pp. 244-250.

Notice of opposition to a European patent dated Apr. 30, 2015, by the European Patent Office in corresponding European Patent Application No. 11709967.1 (Patent No. EP2553034), and Opposition dated Apr. 23, 2015 in corresponding European Patent Application No. 11709967.1 (Patent No. EP2553034) (34 pages).

Japanese Office Action (Notice of Reasons for Rejection) issued in corresponding Japanese Patent Application No. 2013-501771 dated Jan. 5, 2016, with English translation.

Office Action (Notice of Reasons for Rejection) dated Dec. 6, 2016, by the Japanese Patent Office in rresponding Japanese Patent Application No. 2015-196932 and an English translation of the Office Action. (11 pages).

Office Action (Decision of Final Rejection) dated Aug. 22, 2017, by the Japanese Patent Office in corresponding Japanese Patent Application No. 2015-196935 (8 pages including partial English translation).

* cited by examiner

SHAPE MEMORY MATERIAL BASED ON A STRUCTURAL ADHESIVE

RELATED APPLICATION(S)

This application claims priority as a continuation application under 35 U.S.C. § 120 to PCT/EP2011/054642, which was filed as an International Application on Mar. 25, 2011 designating the U.S., and which claims priority to European Application No. 10158076.9 filed in Europe on Mar. 26, 2010. The entire contents of these applications are hereby incorporated by reference in their entireties.

FIELD

Disclosed are compositions comprising curable structural adhesives, which are formed as so-called shape memory materials. Furthermore, the disclosure relates to a reinforcing element for reinforcing cavities of structural components, such as those used, for example, in automobile bodies and the like.

BACKGROUND

Hollow structural components can be used for designs of any kind. This type of construction allows to keep the weight of the design and material expenses low. However, in this type of construction, stability and strength can be lost. In addition, the cavities provide, due to the larger surface of the hollow component, a larger contact surface for corrosion if moisture or dirt enters. Noise caused, for example, by wind or vibration can also be transferred in or along the cavities.

Due to the shape and/or the narrow dimensions of such cavities, it can be difficult to reinforce them efficiently, to insulate them or to control noise transfer.

Local reinforcing elements in the components can be used or integrated, for example, to improve the mechanic properties of hollow structural components. Such reinforcing elements can include metals or plastics or a combination of these materials. In locations that are difficult to access, which can, for example, only be reinforced or sealed after the installation of the component, structure foams can be used. This can be the case, for example, in the production of vehicle structures or bodies. A benefit of the structure foams is that they can be installed in a cavity in an unexpanded state and can be foamed later, for example, by an increase of temperature.

In this manner, the inner wall of the cavity can, for example, also be completely coated after the installation of the reinforcement elements by way of cathodic dip-coating (KTL) and only afterwards reinforced by foaming of the structural adhesive. In an exemplary embodiment, the foaming can be done during the curing of the KTL layer in the oven.

A disadvantage of such reinforcing elements is that the mechanic properties of the structural adhesive are affected by the foaming process.

SUMMARY

According to an exemplary aspect, a composition is provided, comprising: i) at least one curable structural adhesive; and ii) at least one thermoplastic elastomer; wherein the thermoplastic elastomer is present in the structural adhesive as a penetrating polymer network.

According to an exemplary aspect, a reversible forming method is provided, comprising: a) heating an exemplary composition to a temperature above the glass transition temperature $T_g$ of the curable structural adhesive, if it is an epoxy resin composition, or to a temperature above of the melting point of the curable structural adhesive, if it is a polyurethane composition; b) deforming the composition, under tension of the elastomer; c) cooling down the deformed composition below the glass transition temperature $T_g$ of the curable structural adhesive, if it is an epoxy resin composition, or below the melting point of the curable structural adhesive, if it is a polyurethane composition.

According to an exemplary aspect, a molded article formed from an exemplary composition is provided, wherein the molded article is subjected to a reversible forming method comprising: a) heating the composition to a temperature above the glass transition temperature $T_g$ of the curable structural adhesive, if it is an epoxy resin composition, or to a temperature above of the melting point of the curable structural adhesive, if it is a polyurethane composition; b) deforming the composition, under tension of the elastomer; c) cooling down the deformed composition below the glass transition temperature $T_g$ of the curable structural adhesive, if it is an epoxy resin composition, or below the melting point of the curable structural adhesive, if it is a polyurethane composition.

According to an exemplary aspect, a reinforcing element for reinforcing cavities of structural components is provided, comprising a support to which a molded article formed from an exemplary composition is attached, wherein the molded article is subjected to a reversible forming method comprising: a) heating the composition to a temperature above the glass transition temperature $T_g$ of the curable structural adhesive, if it is an epoxy resin composition, or to a temperature above of the melting point of the curable structural adhesive, if it is a polyurethane composition; b) deforming the composition, under tension of the elastomer; c) cooling down the deformed composition below the glass transition temperature $T_g$ of the curable structural adhesive, if it is an epoxy resin composition, or below the melting point of the curable structural adhesive, if it is a polyurethane composition.

According to an exemplary aspect, a method for reinforcing cavities of structural components is provided, the method comprising: a') placing an exemplary reinforcing element in a cavity of a structural component; b') heating the molded article of the reinforcing element: to a temperature above the glass transition temperature $T_g$ of the curable structural adhesive, if the curable structural adhesive is an epoxy resin composition, or to a temperature above of the melting point of the curable structural adhesive, if the curable structural adhesive is a polyurethane composition; and c') curing the curable structural adhesive.

BRIEF DESCRIPTION OF THE DRAWINGS

Exemplary embodiments of the disclosure are described in more detail in the drawings. The same elements in the different figures are marked with the same reference signs. Of course, the disclosure is not limited to exemplary embodiments shown and described.

The figures show the following.

Figure 1:
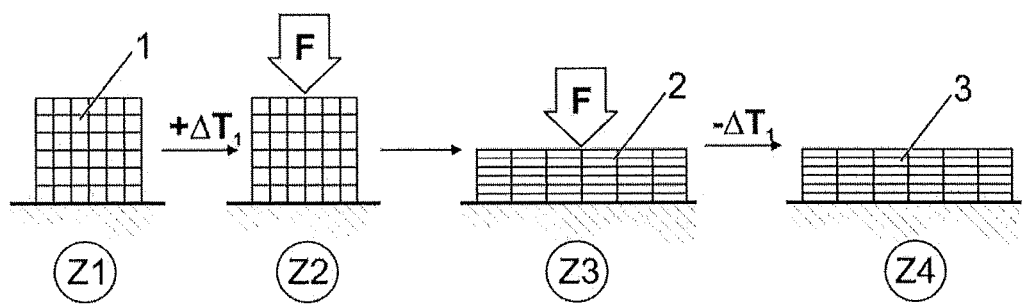
FIG. 1 is a schematic diagram of the production of a molded article or a composition in its temporary shape, according to an exemplary aspect.

The figures show exemplary elements.

DETAILED DESCRIPTION

According to an exemplary embodiment, a reinforcing element is provided which ameliorates or overcomes the disadvantages of comparative reinforcing elements and allows to close a gap between cavity and reinforcing element without affecting the mechanic properties of the structural adhesive.

It was found that compositions according to an exemplary embodiment can realize shape memory materials, which change their shape, for example, due to the influence of temperature and thus expand in a desired direction without an accompanied increase in volume, for example, through a foaming process.

In a first exemplary aspect, a composition is provided, comprising
i) at least one curable structural adhesive; and
ii) at least one thermoplastic elastomer;
wherein the thermoplastic elastomer is present in the structural adhesive as penetrating polymer network.

The curable structural adhesive can be an epoxy resin composition or a polyurethane composition.

If the curable structural adhesive is an epoxy resin composition, then it can have a glass transition temperature $T_g$, which is above room temperature.

If the curable structural adhesive is a polyurethane composition, then it can have a melting point, which is above room temperature.

In the present document, information regarding the glass transition temperature $T_g$ relates to an embodiment of the composition in which the curable structural adhesive is an epoxy resin composition, unless stated otherwise. Correspondingly, information regarding the melting point relates to an embodiment in which the curable structural adhesive is a polyurethane composition.

The glass transition temperature $T_g$ and melting points can be measured by DSC (Differential Scanning Calorimetry), wherein the measurements are performed with a Mettler Toledo 822e device at a heating rate of 10° C./min to 180° C. on 5 mg samples. The measuring values can be determined from the measured DSC curve with the help of the DSC software.

The term "penetrating polymer network" includes a semi-interpenetrating polymer network (SIPN)) pursuant to IUPAC Compendium of Chemical Terminology, 2nd Edition (1997). The SIPN comprises at least one network and at least one linear or branched polymer, wherein this polymer at least partially penetrates the network. In an exemplary composition, the elastomer forms the network, and the polymer is a part of the curable structural adhesive.

An exemplary composition, which represents a "shape memory material," can be formed in a certain shape ("original shape") during its production or processing and can have a solid consistency after this forming. The structural adhesive exists at a temperature below its glass transition temperature $T_g$ or below its melting point. In this shape, the elastomer, which exists as penetrating polymer network in the structural adhesive, is substantially relaxed. If desired, the composition can then be heated to a temperature above the glass transition temperature $T_g$ or the melting point of the structural adhesive and formed into any shape ("temporary shape"). In this temporary shape the elastomer is present in a strained state. The composition is held in this temporary shape and the temperature of the composition is lowered again below the glass transition temperature $T_g$ or below the melting point of the structural adhesive, causing the composition to harden in the temporary shape. In this temporary shape the composition is stable when stored and can be subjected to processing, for example, punching or cutting. If at a later time the composition is reheated to a temperature above the glass transition temperature $T_g$ or the melting point of the structural adhesive, the elastomer regains its relaxed shape and thus deforms the entire composition into its original shape.

According to an exemplary aspect, provided is a shape memory material comprising an exemplary composition.

For example, an exemplary composition is a shape memory material, which is solid at room temperature (23° C.), allowing optimal handling of the material in its original and in its temporary shape.

For an exemplary composition to be solid at room temperature, the curable structural adhesive can have a glass transition temperature $T_g$, in case of an epoxy resin composition, or a melting point, in case of a polyurethane composition, which is above room temperature. Otherwise, an exemplary composition, after it is formed in its temporary shape, may not keep the elastomer, which is strained in this temporary shape, in shape at room temperature.

For example, the curable structural adhesive is an epoxy resin composition with a glass transition temperature $T_g$ in the range of 23° C. to 95° C., for example, 30° C. to 80° C., for example, 35° C. to 75° C.; or a polyurethane composition with a melting point in the range of 23° C. to 95° C., for example, 30° C. to 80° C., for example, 35° C. to 75° C.

Furthermore, for example, the surface of the composition is not sticky at room temperature, thereby facilitating its handling.

For example, the curable structural adhesive is a hot-curing structural adhesive, which can have a curing temperature in the range of 120° C. to 220° C., for example, 160° C. to 200° C.

If the curable structural adhesive is a hot-curing structural adhesive, it can be desirable to keep in mind during processing of the composition, during which it is formed in its temporary shape, that the composition is not heated to a point that the curing process begins.

For example, the curable structural adhesive is an epoxy resin composition, comprising at least one epoxy resin A and at least one hardener B for epoxy resins, which is activated by an increased temperature. For example, it is a one-component epoxy resin composition.

For example, the epoxy resin A, on average, has more than one epoxy group per molecule and, for example, is a solid epoxy resin or a mixture of a solid epoxy resin with a liquid epoxy resin. The meaning of the term "solid epoxy resin" is well understood to the person skilled in the art of epoxy and is used as opposed to "liquid epoxy resin." The glass transition temperature $T_g$ of solid epoxy resins is above room temperature.

Exemplary solid epoxy resins have the following formula (I).

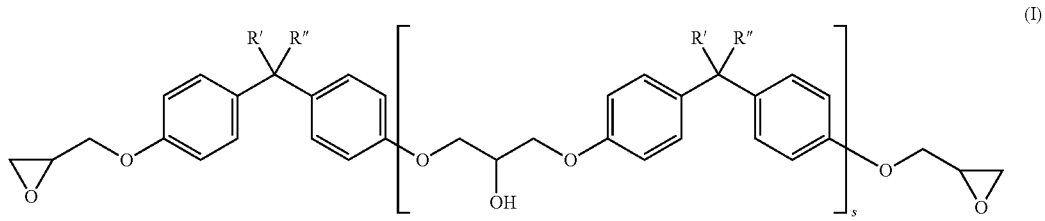

In an exemplary embodiment, the substituents R' and R" represent independently from one another either H or CH$_3$. Furthermore, the index s represents a value of ≥1, for example, ≥1.5, for example, 2 to 12.

Such solid epoxy resins are commercially available, for example, from Dow Chemical Company, USA, from Huntsman International LLC, USA, or from Hexion Specialty Chemicals Inc, USA.

Exemplary liquid epoxy resins, which, for example, can be used together with a solid epoxy resin, have the following formula (II).

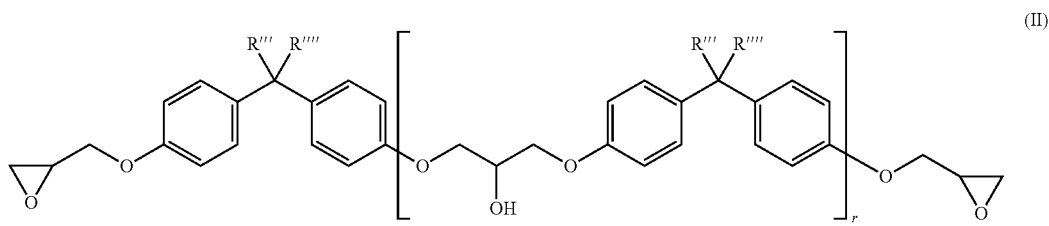

In an exemplary embodiment, the substituents R' and R" represent independent from one another either H or CH$_3$. Furthermore, the index r represents a value of 0 to 1. For example, r represents a value ≤0.2.

For example, these are diglycidyl ethers of bisphenol A (DGEBA), of bisphenol F and of bisphenol A/F. In an exemplary embodiment, the term "A/F" refers to a mixture of acetone with formaldehyde, which can be used as starting material in its production. Such liquid resins are commercially available, for example, under the trade names Araldite® GY 250, Araldite® PY 304, Araldite® GY 282 from Huntsman International LLC, USA, or D.E.R.® 331 or D.E.R.® 330 from Dow Chemical Company, USA, or under the trade name Epikote® 828 or Epikote® 862 from Hexion Specialty Chemicals Inc, USA.

Additional suitable exemplary epoxy resins are so-called novolacs. For example, they have the following formula (III).

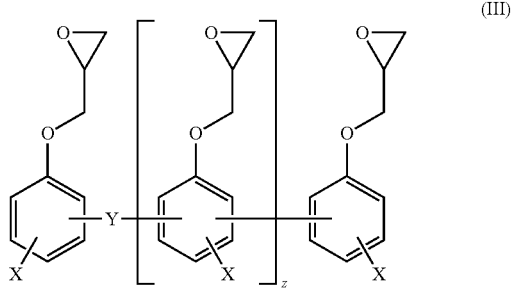

In an exemplary embodiment, the moiety X represents a hydrogen atom or a methyl group. The moiety Y represents —CH$_2$— or a moiety of the formula (IV).

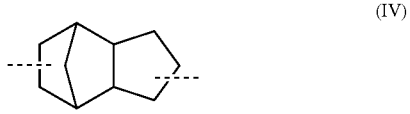

Furthermore, the index z represents a value of 0 to 7, for example, a value of ≥3.

For example, these are phenol or cresol novolacs (Y represents —CH$_2$—).

Such epoxy resins are commercially available under the trade name EPN or ECN and Tactix® 556 from Huntsman International, LLC, USA, or under the product series D.E.N.™ from Dow Chemical Company, USA.

For example, the epoxy resin A constitutes a solid epoxy resin of the formula (I). In a further exemplary embodiment, the hot-curing epoxy resin composition contains at least one solid epoxy resin of the formula (I) and also at least one liquid epoxy resin of the formula (II).

The portion of epoxy resin A amounts to, for example, 2 to 90% by weight, for example, 5 to 70% by weight, for example, 10 to 60% by weight, based on the total weight of the curable structural adhesive.

The hardener B for epoxy resins can be activated by an increased temperature. For example, the hardener B is a hardener, selected from the group consisting of dicyandiamide, guanamine, guanidine, amino guanidine and derivatives thereof; substituted ureas, for example, 3-(3-chloro-4-methylphenyl)-1,1-dimethyl urea (chlortoluron), or phenyl-dimethyl-ureas, for example, p-chlorophenyl-N,N-dimethyl-urea (monuron), 3-phenyl-1,1-dimethyl-urea (fenuron), 3,4-dichlorophenyl-N,N-dimethyl-urea (diuron), and imidazoles and amine complexes.

An example of hardener B is dicyandiamide, for example, in combination with a substituted urea. An exemplary benefit of the combination of dicyandiamide with a substituted urea is the resulting accelerated curing of the composition.

For example, the proportion of the hardener B amounts to 0.05 to 8% by weight, for example, 0.1 to 6% by weight, for example, 0.2 to 5% by weight, based on the total weight of the curable structural adhesive.

The term "hardener" can include catalysts and catalytically active compounds. In this case, it is clear to the person skilled in the art that when a catalyst or a catalytically active compound is used as hardener B, the proportion of hardener B in the total curable structural adhesive can be in the lower range of the indicated range of values.

In addition, the epoxy resin composition may comprise at least one impact strength modifier.

An "impact strength modifier" can include an addition of an organic polymer to an epoxy resin matrix, which in small amounts, for example, between 0.1 and 20% by weight, can effect a significant increase of strength and is therefore able to accept a higher shock or impact stress before the matrix rips or breaks.

Suitable exemplary impact strength modifiers include, for example, reactive liquid rubbers based on nitrile rubber or derivatives of polyether polyol polyurethanes, core shell polymers and any other suitable systems.

Suitable exemplary impact strength modifiers are described as impact strength modifiers D in the European patent document No. EP 08168009.2, the entire content of which is hereby incorporated by reference in its entirety.

For example, the impact strength modifier is a non-thermoplastic elastomer.

For example, the curable structural adhesive is a one-component, hot-curing polyurethane composition, which has a solid consistency at room temperature.

One-component, hot-curing polyurethane compositions, which have a solid consistency at room temperature can have different curing mechanism.

In a first exemplary embodiment, polyurethane compositions are used, which have, in addition to a solid isocyanate group terminated polyurethane polymer, furthermore at least one aldimine, for example, a polyaldimine, as hardener. By increasing the temperature and softening of the polyurethane polymer which is caused by it, water, for example, in the form of humidity, can enter into the polyurethane composition, thereby causing hydrolysis of the aldimines and thus a release of amines, which subsequently react with the isocyanate groups and result in the curing of the composition.

For example, exemplary suitable hot-curing polyurethane compositions are described in WO 2008/059056 A1, the entire content of which is hereby incorporated by reference in its entirety.

In a second exemplary embodiment, polyurethane compositions can be used, which, in addition to an isocyanate group terminated polyurethane polymer, have furthermore at least one hardener, which contains isocyanate-reactive groups and is present as a blocked form. The block can be of the chemical or physical type. Examples for suitable chemically blocked hardeners are polyamines bound to metals through complexation, for example, complex compounds of methylene dianiline (MDA) and sodium chloride. Such complex compounds can be described with the molecular formula (MDA)$_3$.NaCl. A suitable type is available from Chemtura Corp., USA as dispersion in diethylhexyl phthalate under the trade name Caytur® 21. The complex decomposes when heated to 80 to 160° C. with increasing rate at higher temperature releasing methylene dianiline as active hardener.

Examples for physically blocked hardeners are micro-encapsulated hardeners. Examples suited for use as hardeners in micro-encapsulated form are two or polyhydric alcohols, short-chain polyester polyols, aliphatic, cycloaliphatic and aromatic amino alcohols, hydrazides of dicarboxylic acids, aliphatic polyamines, cycloaliphatic polyamines, ether group-containing aliphatic polyamines, polyoxyalkylene polyamines, for example, available under the name Jeffamine® (from Huntsman International LLC, USA), aromatic polyamines. Exemplary are aliphatic, cycloaliphatic and aromatic polyamines, for example, ethanol amine, propanol amine, butanol amine, N-methyl ethanolamine, diethanol amine, triethanol amine.

A detailed list of suitable hardeners for use in micro-encapsulated form can be found, for example, on page 14, starting at line 25 in WO 2009/016106 A1, the entire content of which is hereby incorporated by reference in its entirety.

The micro-encapsulation of these hardeners can be performed according to any suitable method, for example, through spray drying, surface polymerization, coacervation, dip or centrifuge methods, fluidized bed methods, vacuum encapsulating, electro-static micro-encapsulation. The micro-capsules obtained can have a particle size of 0.1 to 100 μm, for example, 0.3 to 50 μm. The size of the micro-capsules can be dimensioned in such a way that on the one hand they open effectively when heated, and on the other hand, after curing, optimum homogeneity and thus cohesion strength of the structural adhesive is obtained. For example, they may not have any damaging impact on the adhesion properties of the structural adhesive. Materials for the capsule shell may be polymers, which are insoluble in the hardener to be encapsulated and have a melting point of 50 to 150° C. Examples for suitable polymers include hydrocarbon waxes, polyethylene waxes, wax ester, polyester, polyamides, polyacrylates, polymethacrylates or mixtures of several such polymers.

In a third exemplary embodiment, isocyanate groups terminated polyurethane polymers can be used, whose isocyanate groups were reacted with thermally unstable blocking groups, such as for example with caprolactam, or such, whose isocyanate groups were dimerized into thermally unstable uretdiones.

In a fourth exemplary embodiment, polyurethane compositions can be used, which comprise in addition to a hydroxyl group terminated polyurethane polymer and/or at least one polymer polyol, as described above, furthermore at least one encapsulated or surface-deactivated polyisocyanate as hardener. Encapsulated or surface-deactivated polyisocyanates are described, for example, in EP 0 204 970 or in EP 0 922 720, the entire content of which is hereby incorporated by reference in its entirety. The above described are suitable polyisocyanates.

If the curable structural adhesive is a polyurethane composition, the components for its production, for example, polyisocyanate and polyol, can be selected in regard to their molecular weight and their functionality, for example, so that the polyurethane has a melting point, which is above room temperature, for example, in the range of 23 to 95° C.

The curable structural adhesive can comprise additional components, as they can be used in curable structure adhesives.

For example, the curable structural adhesive additionally comprises at least one filler. For example, it is mica, talcum, caolin, wollastonite, feldspar, syenith, chlorite, bentonite, montmorillonite, calcium carbonate (precipitated or milled), dolomite, quartz, silicic acid (pyrogen or precipitated), cristobalite, calcium oxide, aluminum hydroxide, magnesium oxide, hollow ceramic spheres, hollow glass spheres, hollow organic spheres, glass spheres, color pigments. Fillers can include both organically coated and also uncoated commercially available forms that are suitable for use herein. Another example includes functionalized alumoxanes, such as those described, for example, in U.S. Pat. No. 6,322,890, the entire content of which is hereby incorporated by reference in its entirety.

For example, the proportion of the filler amounts to 1 to 60% by weight, for example, 5 to 50% by weight, for example, 10 to 35% by weight, based on the weight of the total curable structural adhesive.

As additional components, the curable structural adhesive can comprise, for example, thixotropic set-up agents such as, for example, aerosols or nanoclays, strength modifiers, reactive diluents as well as other suitable components.

For example, the composition comprises no chemical propellant or any other agent, which results in foaming of the composition.

For example, the curable structural adhesive is a one-component, hot-curing epoxy resin composition.

The thermoplastic elastomer that is present in an exemplary composition, which is present as penetrating polymer network in the structural adhesive, can have a glass transition temperature $T_g$ (elastomer), which is lower than the glass transition temperature $T_g$ or than the melting point of the curable structural adhesive.

For example, the thermoplastic elastomer has a melting point, which is above the glass transition temperature $T_g$ or the melting point of the curable structural adhesive. For example, the thermoplastic elastomer has a melting point of 50° C. to 200° C., for example, 70° C. to 160° C.

The thermoplastic elastomer can have a molecular weight $M_w$ of $\geq 50,000$ g/mol, for example, 70,000 to 300,000 g/mol. In this molecular weight range, the thermoplastic elastomer can have an exemplary benefit that it may be thermo-plastically processed and have good mechanic properties. The molecular weight $M_w$ describes here the average weight of the molecular weight.

For example, the thermoplastic elastomer is selected from the group consisting of polyolefins and polyolefin copolymers. These are, for example, polyethylene (PE), polypropylene (PP), ethylene vinyl acetate (EVA) and the like. It is also possible, for example, that a mixture of two or more elastomers is present in the composition according to the disclosure.

The proportion of thermoplastic elastomer can amount to 1 to 40% by weight, for example, 10 to 20% by weight, based on the total weight of the composition.

When preparing an exemplary composition, the curable structural adhesive can be mixed with the thermo-plastic elastomer at a temperature above its glass transition temperature $T_g$ or its melting point until a homogenous mixture is obtained. For example, the mixing of the curable structural adhesive with the thermo-plastic elastomer is done at a temperature above the melting point of the elastomer, for example, in an extruder.

For example, if the curable structural adhesive is a hot-curing structural adhesive, the structural adhesive can be mixed with the elastomer, before the hardener is added. As a result, during mixing the temperature can be set up to or even above the curing temperature of the hot-curing structural adhesive without curing of the structural adhesive. For example, a more efficient mixing is obtained at higher temperatures.

In a second exemplary aspect, disclosed is a molded article, which is subjected to a reversible forming, wherein the forming comprises the following steps:

a) heating of an exemplary composition to a temperature above the glass transition temperature $T_g$ of the curable structural adhesive, if it is an epoxy resin composition, or to a temperature above the melting point of the curable structural adhesive, if it is a polyurethane composition;

b) deforming the composition, under tension of the elastomer;

c) cooling the deformed composition below the glass transition temperature $T_g$ of the curable structural adhesive, if it is an epoxy resin composition, or below the melting point of the curable structural adhesive, if it is a polyurethane composition.

FIG. 1 shows an exemplary schematic of the production of a molded article from a composition based on an epoxy resin composition, as described above.

In an exemplary embodiment, the solid composition 1 can be present in its initial state Z1 in the original shape, into which it was formed, for example, at production. In a first step, the composition is then heated by a temperature $\Delta T_1$ to a temperature, which is above the glass transition temperature $T_g$ of the epoxy resin composition, however, in the case of a hot-curing epoxy resin composition, below its curing temperature. When the composition is in this state Z2, it will be formed in its temporary, still deformable shape 2 by impact of a force F. In this temporary, still deformable shape, as shown in state Z3, the elastomer is present in a strained shape. The composition is maintained in this temporary shape and the temperature of the composition is again lowered by the temperature $\Delta T_1$ to a temperature below the glass transition temperature $T_g$ of the epoxy resin composition. In this process, the composition hardens and is now present in its solid temporary shape 3, as shown in state Z4. In this state as a molded article, the composition is stable when stored and can be processed further. For example, the molded article can be punched or cut and/or, for example, can be attached to a support or arranged in a cavity of a structural component for which strengthening is desired.

The deformation of the exemplary composition, where it is formed into its temporary shape, can be done by pressing, rolling, extruding or the like. For example, for the deformation it can be beneficial that the composition in the deformed state is cooled down to a temperature below the glass transition temperature $T_g$ or the melting point of the curable structural adhesive, so that it remains in its temporary shape.

In another exemplary aspect, a reinforcing element is disclosed for reinforcing cavities of structural components, comprising a support to which a molded article is attached as described above.

The support can be composed of any suitable material. For example, the support can include a plastic, a metal or a combination of a plastic and a metal.

Exemplary plastics are polyurethanes, polyamides, polyesters and polyolefins and polyolefin copolymers, for example, high temperature-resistant polymers such as poly (phenylene ethers), polysulfones or polyethersulfones. Exemplary plastics are polyamides (PA) such as PA6 or PA66, polyethlyene and polypropylene, and polystyrene and copolymers such as acrylonitrile butadiene styrene (ABS). Exemplary metals are aluminum, steel, nickel and alloys thereof. Furthermore, the metal can be present in an untreated form or it can be pretreated with suitable agents, for example, to prevent corrosion or to improve the adhesion.

In addition, the support can have any suitable composition and any structure. It can, for example, be solid, hollow or foamed or have a latticed structure. For example, the surface of the support can be smooth, rough or structured.

In addition to its exemplary function as a support for the composition or the mold part produced from it, the support can also contribute to the structural reinforcement or the sealing of the component or noise reduction.

The support can have at least one fastening means, for example, a clip, to fasten and place the reinforcement element in a cavity. The fastening of the reinforcement element with a clip is, for example, suitable for applications in which it is desirable for the entire surface of the component, for example, also for the inner cavity wall, for example for dip coating, to be reachable. In such cases, a fastening, for example, through gluing may not be suitable, since the coating may not reach the place of the bonding.

For example, the support can include a plastic which is coated with a metal. In an exemplary embodiment, the above described materials can include a plastic and a metal.

In an exemplary embodiment, the metal, with which the plastic is coated, can be attached to the plastic in any suitable manner. The fastening can be done, for example, by mechanic means of fastening such as nails, screws, rivets, mechanic clips, clamps, flanges and the like, or by bonding of the metal and the plastic. Furthermore, the metal can also be applied to the plastic by means of plastic galvanization.

For example, the layer thickness of the metal layer on the plastic support is 0.03 to 1.5 mm.

The support made of plastic, which is coated with a metal, can have an exemplary benefit compared to a strictly metal support that it is on one hand lighter, and on the other hand, it can be varied widely in its mechanic properties and its design due to the properties of the plastic and the selection of the material and its processing. The exemplary benefit of the metal coating compared to a strictly plastic support is the fact that the metals can adhere more easily. Another exemplary benefit of the metal coating is the fact that in case of hot-curing structure adhesives the metal layer may be heated by means of induction locally and efficiently.

Figure 2:
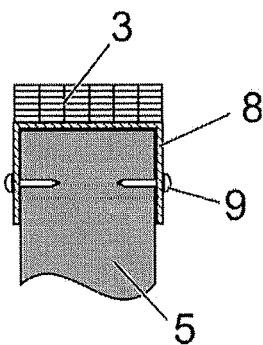
FIG. 2 is a schematic diagram of a reinforcement element, according to an exemplary aspect.

FIG. 2 shows an exemplary support 5 made of a plastic, which is coated with a metal 8. In an exemplary embodiment, the metal is attached to the support with nails 9. On the metal layer there is a molded article 3 including an exemplary composition in its temporary state.

Figure 3:
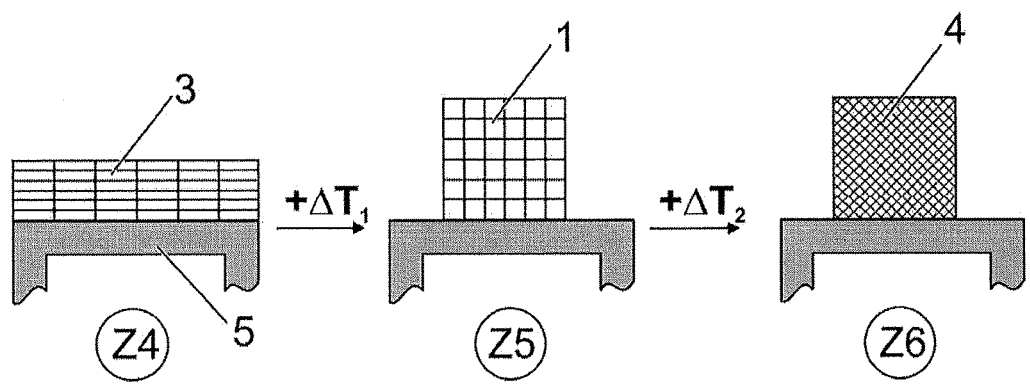
FIG. 3 is a schematic diagram of the shape change and the curing of the composition, according to an exemplary aspect.

FIG. 3 shows schematically an exemplary reinforcing element in its initial state Z4 including a support 5, to which a molded article 3 made of an exemplary composition is attached with a hot-curing epoxy resin composition as structural adhesive and elastomer in its temporary shape. In a first step, the molded article 3 is then heated by a temperature $\Delta T_1$ to a temperature, which is above the glass transition temperature $T_g$ of the epoxy resin composition, wherein the elastomer relaxes and leads to a deformation of the molded article or composition 1 to its original shape. This corresponds to state Z5 in FIG. 3. Then, the temperature is further increased by $\Delta T_2$ to a temperature at which the epoxy resin composition cures. The cured composition 4 is shown in state Z6.

The temperature increase, which can lead to the deformation of the molded article, and the temperature increase for the curing of the structural adhesive, do not necessarily have to occur in two steps. For example, it is possible to have both steps occur consecutively by a steady temperature rise.

According to an exemplary embodiment, disclosed is the use of a reinforcement element for reinforcing cavities of structural components. For example, such structural components are used in bodies and/or frames of vehicles and means of transportation, for example, of water, land or air vehicles. For example, disclosed is the use of a reinforcement element in bodies or frames of automobiles, trucks, railroad wagons, boats, ships, helicopters and airplanes, for example, automobiles.

Another exemplary aspect relates to a method for reinforcing cavities of structural components comprising the steps:

a') placing a reinforcement element according to an exemplary aspect in the cavity of a structural component;

b') heating the molded article 3 on the reinforcing element to a temperature above the glass transition temperature $T_g$ of the curable structural adhesive, if it is an epoxy resin composition, or to a temperature above of the melting point of the curable structural adhesive, if it is a polyurethane composition, wherein the molded article reverts to its shape before the forming, i.e., to the original shape; and c') curing the curable structural adhesive.

In an exemplary embodiment of a method for reinforcing cavities of structural components, for example, the support of the reinforcement element is made of an inductively heatable metal or a material, which is coated by an inductively heatable metal, and the curable structural adhesive is a hot-curing structural adhesive, and the steps b') and c') are effected by induction, that is, by means of an electromagnetic alternating field of an induction coil.

Figure 4:
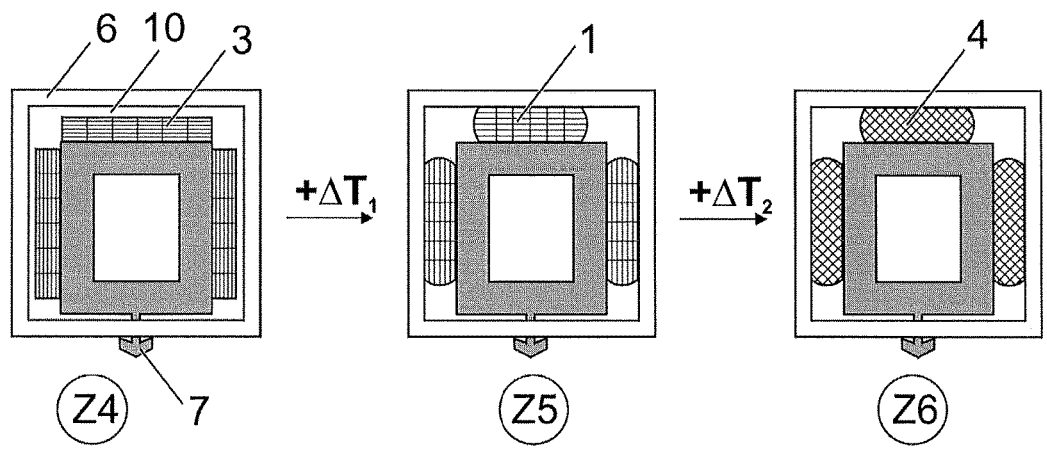
FIG. 4 is a schematic diagram of the reinforcement of a cavity of a structural component, according to an exemplary aspect.

FIG. 4 shows schematically an exemplary reinforcement in a cavity of a structural component 6, wherein on the inside of the structural component a reinforcing element is attached, comprising a support 5 and several molded articles 3 made from an exemplary composition with hot-curing epoxy resin composition as structural adhesive and elastomer in its temporary shape. In an exemplary embodiment, the support of the reinforcement element is attached to the structural component with a clip 7. In an exemplary embodiment, the molded article or the composition is in its temporary shape (state Z4) and is subsequently heated by a temperature $\Delta T_1$ to a temperature, which is above the glass transition temperature $T_g$ of the curable structural adhesive. In this exemplary process, the elastomer relaxes and leads to a deformation of the molded article or the composition 1 to its original shape, thereby closing the gap 10 left open between reinforcing element and cavity and the exemplary composition will adhere to the inner wall of the cavity (state Z5). After another temperature increase by a temperature $\Delta T_2$ the hot-curing structural adhesive cures. FIG. 4, state Z6, shows the reinforced structural component with the cured composition 4.

Figure 5:
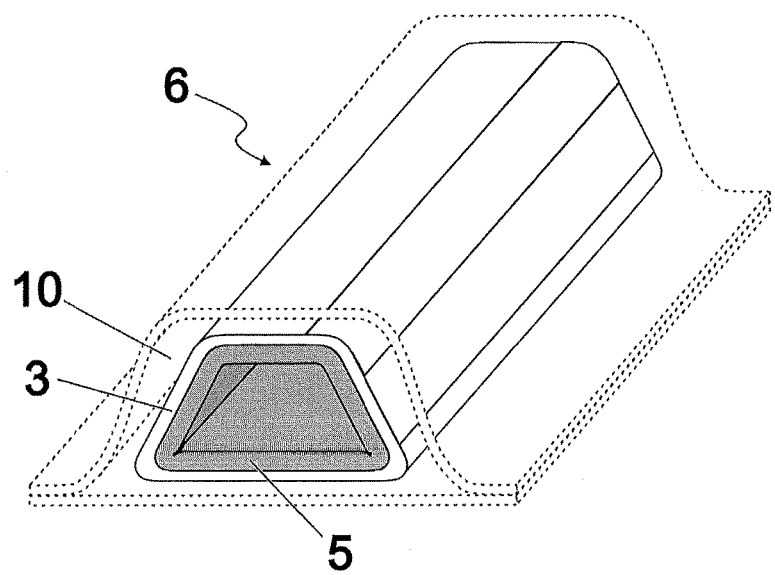
FIG. 5 is a schematic diagram of a reinforcement element in a cavity of a structural component, according to an exemplary aspect.

FIG. 5 shows an exemplary reinforcing element, as it is used in a cavity 10 of a structural component 6, prior to the deformation of the molded article or the exemplary composition in its temporary shape 3, which is located on a support 5.

Figure 6:
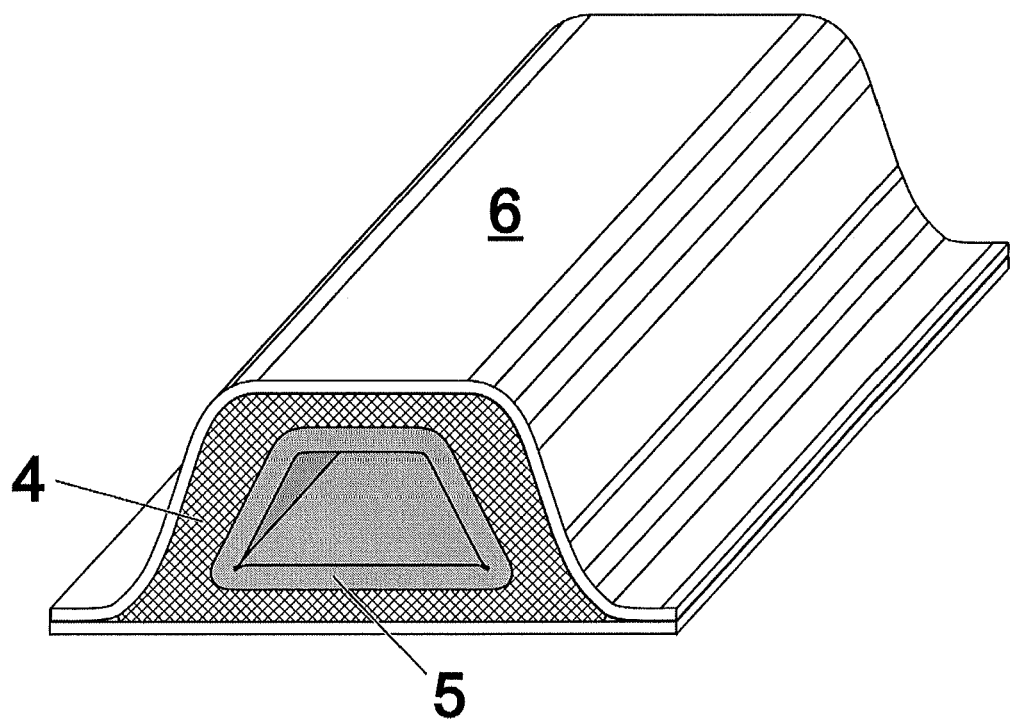
FIG. 6 is a schematic diagram of a reinforced structural component, according to an exemplary aspect.

FIG. 6 shows the exemplary reinforcing element of FIG. 5, inserted in a cavity of a structural component 6, wherein in this case the molded article or the exemplary composition has already returned to its original shape and adheres to the inner walls of the structural component 6. Furthermore, FIG. 6 shows the cured composition 4.

The shape and structure of the reinforcing elements can be selected as desired, for example, according to its place of use.

Furthermore, the disclosure relates to an exemplary cured composition, as it is available from a curing process, for example, by hot-curing, from a composition described above.

Examples

Exemplary embodiments are listed below, which shall explain the described disclosure in more detail. The disclosure is not limited to the exemplary embodiments described.

The form stability of the materials in the temporary shape was determined during a 7 day period at standard climate (23° C./50% humidity) ("relaxation"), the elastic recovery to the original shape after 7 days of storage at standard climate. The dimensions of the original shape of the specimens were 10×10×6 mm (l×w×h). The height in the original shape ($H_0$) was therefore 6 mm. By pressing at an increased temperature and subsequent cooling, the samples were formed into the temporary shape with a height of 3 mm ($H_{Temp}$), which corresponds to a compression of 50% and thus allows a height gain of 100% when reversing.

The relaxation is defined as:

$$\text{Relaxation } [\%] = \frac{H_{Temp}(\text{day 7}) - H_{Temp}(\text{day 0})}{H_{Temp}(\text{day 0})} \cdot 100$$

The elastic recovery is determined as:

$$\text{Elastic recovery } [\%] = \frac{H_0(\text{day 7, after curing})}{H_0(\text{day 0})} \cdot 100$$

Production of Specimens

A structural adhesive based on epoxy resin compositions was used for the following examples. The thermoplastic elastomers used in the examples 1 to 6 are an ethylene vinyl acetate copolymer (Elvax® 470, available from DuPont Company, USA), an ethylene octene copolymer (Engage® 8450, available from Dow Chemical Company, USA) and a thermoplastic polyurethane (Pearlbond® D12C75, available from Merquinsa S.L., Spain).

TABLE 1

| formulations 1 to 6 and reference foam Ref in % by weight, and results | | | | | | | |
|---|---|---|---|---|---|---|---|
| | Ref | 1 | 2 | 3 | 4 | 5 | 6 |
| Araldite ® GT 7004[a] | 85.4 | 88.3 | 79.5 | 57.9 | 79.5 | 57.9 | 57.9 |
| Araldite ® GY 250[a] | | | | | | | |
| Dicyandiamide[b] | 1.6 | 1.7 | 1.5 | 1.1 | 1.5 | 1.1 | 1.1 |
| Jeffamine ® D230[a] | | | | | | | |
| Armeen ® CD[c] | | | | | | | |
| Elvax ® 470 | | | 9 | 31 | | | |
| Engage ® 8450 | | | | | 9 | 31 | |
| Pearlbond ® D12C75 | | | | | | | 31 |
| Luvopor ® OB[d] | 3 | | | | | | |
| Aerosil ®[e] | 10 | 10 | 10 | 10 | 10 | 10 | 10 |
| Relaxation [%] | — | 0 | 0 | 0 | 0 | 0 | 0 |
| Elastic recovery [%] | — | 0 | 50 | 90 | 65 | 90 | 55 |
| E module [MPa] | 230 | 1700 | 1500 | 480 | 1400 | 740 | 2200 |
| Yield stress [MPa] | 11 | 60 | 47 | 20 | 48 | 30 | 65 |

[a] available from Huntsman International LLC, USA;
[b] available from AlzChem GmbH, Germany;
[c] available from Akzo Nobel Surface Chemistry AB, Sweden;
[d] available from Lehmann&Voss&Co, Germany;
[e] available from Wacker Chemie AG, Germany.

Test Method

The elasticity module (E module) and the yield stress were determined in cured specimens with the dimensions 10×10×6 mm (l×w×h), following DIN EN ISO 604, at a constant deformation speed of 10 mm/min. The E module was determined as secant module for the expansion differential of 0.5 and 1%. The yield stress corresponds to the intersection of two secants of the expansion differentials of 0.5 and 1% or 10 and 15%.

The formulations 1 to 6, and the reference foam Ref were produced by mixing of the components according to Table 1 in the corresponding weight percentages in a dual screw extruder at temperatures above the melting temperature of the respectively used thermoplastic elastomers or below the decomposition temperature of the chemical propellants (Ref).

The structural adhesive was cured in all specimens for 60 min at 180° C.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 1 composition in the original shape
2 composition (deformable)
3 molded article (temporary shape)
4 cured composition
5 support
6 structural component
7 clip
8 metal layer
9 nail
10 gap
F force
Z1 state of the composition in the original shape
Z2 state of the deformable composition
Z3 state of the composition in the temporary condition (molded article)
Z4 state of the cured composition
$\Delta T_1$ temperature difference between temperature below the $T_g$ of the epoxy resin composition and temperature above the $T_g$ of the epoxy resin composition
$\Delta T_2$ temperature difference between temperature above the $T_g$ of the epoxy resin composition and the curing temperature of the epoxy resin composition.

What is claimed is:

1. A composition, comprising:
    i) at least one curable structural adhesive; and
    ii) at least one thermoplastic elastomer;
    wherein the at least one thermoplastic elastomer is present in the at least one curable structural adhesive as a penetrating polymer network and
    wherein the at least one thermoplastic elastomer is in a strained state obtained by a process comprising:
        heating a composition comprising the at least one curable structural adhesive and the at least one thermoplastic elastomer to a temperature above the glass transition temperature or the melting temperature of the at least one curable structural adhesive;
        forming the composition to a different, temporary shape; and
        lowering the temperature of the composition below the glass transition temperature or below the melting point of the at least one curable structural adhesive while the composition is held in the temporary shape, causing the composition to harden in the temporary shape, and wherein the composition is solid at room temperature.

2. The composition according to claim 1, wherein the at least one thermoplastic elastomer has a molecular weight of $M_w$ of greater than or equal to 50,000 g/mol.

3. The composition according to claim 1, wherein the at least one thermoplastic elastomer is present in an amount of 10 to 20% by weight, based on the total weight of the composition.

4. The composition according to claim 1, wherein when the composition is reheated to a temperature above the glass transition temperature Tg or the melting point of the at least one curable structural adhesive, the at least one thermoplastic elastomer regains its original, relaxed shape and thus deforms the entire composition into its original relaxed shape.

5. The composition according to claim 1, wherein the at least one curable structural adhesive is a polyurethane composition.

6. The composition according to claim 1, wherein the elastic recovery of the composition comprising the thermoplastic elastomer in the strained state, is 50% to 90%.

7. The composition according to claim 1, wherein the at least one curable structural adhesive is a hot-curing structural adhesive.

8. The composition according to claim 7, wherein the hot-curing structural adhesive has a curing temperature of 120° C. to 220° C.

9. The composition according to claim 1, wherein the at least one curable structural adhesive is selected from the group consisting of an epoxy resin composition and a polyurethane composition.

10. The composition according to claim 9, wherein the at least one curable structural adhesive has a glass transition temperature $T_g$ in the range of 23° C. to 95° C., if the at least one curable structural adhesive is the epoxy resin composition or the at least one curable structural adhesive has a melting point in the range of 23° C. to 95° C., if the at least one curable structural adhesive is the polyurethane composition.

11. The composition according to claim 9, wherein the at least one curable structural adhesive is the epoxy resin composition comprising at least one epoxy resin A and at least one hardener B for epoxy resins, which is activated by an increased temperature.

12. The composition according to claim 9, wherein the at least one thermoplastic elastomer has a melting point which is above the glass transition temperature $T_g$ of the at least one curable structural adhesive, if it is the epoxy resin composition, or the at least one thermoplastic elastomer has a melting point which is above the melting point of the at least one curable structural adhesive, if it is the polyurethane composition.

13. The composition according to claim 12, wherein the at least one thermoplastic elastomer is selected from the group consisting of polyolefins and polyolefin copolymers.

14. A molded article, comprising the composition according to claim 4.

15. The molded article according to claim 14, wherein: the at least one curable structural adhesive has a glass transition temperature $T_g$ in the range of 23° C. to 95° C., if the at least one curable structural adhesive is the epoxy resin composition, or the at least one curable structural adhesive has a melting point in the range of 23° C. to 95° C., if the at least one curable structural adhesive is the polyurethane composition.

16. The molded article according to claim 14, wherein the at least one curable structural adhesive is the epoxy resin composition comprising at least one epoxy resin A and at least one hardener B for epoxy resins, which is activated by an increased temperature.

17. A reinforcing element for reinforcing cavities of structural components, comprising a support and the molded article of claim 14, wherein the molded article is attached to the support.

18. The reinforcing element according to claim 17, wherein: the at least one curable structural adhesive has a glass transition temperature $T_g$ in the range of 23° C. to 95° C., if the at least one curable structural adhesive is the epoxy resin composition, or the at least one curable structural adhesive has a melting point in the range of 23° C. to 95° C., if the at least one curable structural adhesive is the polyurethane composition.

19. The reinforcing element according to claim 17, wherein the at least one curable structural adhesive is the epoxy resin composition comprising at least one epoxy resin A and at least one hardener B for epoxy resins, which is activated by an increased temperature.

20. A method for reinforcing cavities of structural components, the method comprising:
a') placing the reinforcing element according to claim 17 in a cavity of a structural component;
b') heating the molded article of the reinforcing element:
to a temperature above the glass transition temperature $T_g$ of the at least one curable structural adhesive, if the at least one curable structural adhesive is the epoxy resin composition, or to a temperature above of the melting point of the at least one curable structural adhesive, if the at least one curable structural adhesive is the polyurethane composition; and
c') curing the at least one curable structural adhesive.

21. The method according to claim 20, wherein the support of the reinforcing element is made of an inductively heatable metal or a material coated with an inductively heatable metal, wherein the at least one curable structural adhesive is a hot-curing structural adhesive and wherein the steps b') and c') are effected by induction.

22. The reinforcing element according to claim 17, wherein the support is made of a plastic, a metal or a combination of a plastic and a metal.

23. The reinforcing element according to claim 22, wherein the support is made of a plastic coated with a metal.

24. A method, comprising:
a) providing a composition, comprising:
  i) at least one curable structural adhesive; and
  ii) at least one thermoplastic elastomer;
    wherein the at least one thermoplastic elastomer is present in the at least one curable structural adhesive as a penetrating polymer network;
b) heating the composition comprising the at least one curable structural adhesive and the at least one thermoplastic elastomer to a temperature above the glass transition temperature or the melting temperature of the at least one curable structural adhesive;
c) forming the composition to a different, temporary shape; and
d) lowering the temperature of the composition below the glass transition temperature or below the melting point of the at least one curable structural adhesive while the composition is held in the temporary shape, causing the composition to harden in the temporary shape,
  wherein the composition is solid at room temperature and wherein the at least one thermoplastic elastomer is in a strained state.

* * * * *